United States Patent [19]

Fischbach

[11] Patent Number: 5,724,884
[45] Date of Patent: Mar. 10, 1998

[54] VALVE FOR A COOKING UTENSIL

[75] Inventor: Wolfgang Fischbach, Daaden, Germany

[73] Assignee: Heinrich Baumgarten KG, Neunkirchen, Germany

[21] Appl. No.: 746,316

[22] Filed: Nov. 12, 1996

[30] Foreign Application Priority Data

Nov. 15, 1995 [DE] Germany .................. 295 18 107.9 U

[51] Int. Cl.$^6$ .......................... A47J 27/092; F16K 17/02
[52] U.S. Cl. .................. 99/337; 99/403; 220/314; 220/316
[58] Field of Search .......................... 99/337, 338, 403, 99/407–410; 220/314, 316, 912, 203.29, 89.4, 203.04; 137/532, 534, 72, 529, 542, 556, 523

[56] References Cited

U.S. PATENT DOCUMENTS

| | | | |
|---|---|---|---|
| 2,670,755 | 3/1954 | Kendrick . | |
| 3,823,657 | 7/1974 | Luetolf | 99/337 |
| 3,949,781 | 4/1976 | Scalabrin | 137/532 |
| 4,147,272 | 4/1979 | Stenner et al. | 137/72 X |
| 4,160,462 | 7/1979 | Rossi-Ashton | 137/534 X |
| 4,313,371 | 2/1982 | Jackson et al. | 99/337 |
| 4,461,452 | 7/1984 | Krejza | 251/144 |
| 4,560,143 | 12/1985 | Robinson | 220/203.29 |
| 4,711,366 | 12/1987 | Chen | 220/316 |
| 4,930,408 | 6/1990 | King et al. | 99/337 X |
| 5,297,473 | 3/1994 | Thelen et al. | 220/316 X |
| 5,370,257 | 12/1994 | Chameroy et al. | 220/316 |
| 5,442,998 | 8/1995 | Niese | 99/403 X |
| 5,564,328 | 10/1996 | Huang | 220/314 |

FOREIGN PATENT DOCUMENTS

| | | |
|---|---|---|
| 495 827 | 9/1950 | Belgium . |
| 1 925 264 | 11/1970 | Germany . |
| 9410528.6 | 10/1994 | Germany . |
| 295 01 112.2 | 5/1995 | Germany . |
| 398 922 | 3/1966 | Switzerland . |
| 663 780 | 12/1951 | United Kingdom . |
| 2 123 528 | 2/1984 | United Kingdom . |

*Primary Examiner*—Timothy F. Simone
*Attorney, Agent, or Firm*—Flynn, Thiel, Boutell & Tanis, P.C.

[57] ABSTRACT

A valve is needed in a cooking utensil operating with an increased internal pressure, which valve is at the same time also capable of regulating the internal pressure, and, in particular, takes care that a nonpermissibly high internal pressure is reduced through a pressure release with the outside. Such valves are designed with many parts and are complicated and are difficult to handle also during cleaning. The invention provides a valve, which is manufactured essentially of a single piece of a rubber-elastic material, and permits at the same time to carry out all of the necessary functions.

15 Claims, 1 Drawing Sheet

VALVE FOR A COOKING UTENSIL

FIELD OF THE INVENTION

The invention relates to a valve for a cooking utensil or the like, for example a pressure cooker, which is operated with excess pressure and can be closed off with a lid, including a valve member, which is arranged in a valve opening provided in the lid, axially aligned and movably within said valve opening, and indicates, controls and monitors the various operating stages of the cooking utensil.

BACKGROUND OF THE INVENTION

It has been known for a long time to arrange an indicating pin in a pressure cooker, which pin is axially adjustable by the pressure existing in the cooking utensil against a restoring force. The indicating pin can be moved in a passage in the utensil wall of the cooking utensil, in particular in the lid, in such a manner that it is driven out of the cooking utensil by an increasing pressure so that the length of the indicating pin above the utensil wall indicates the pressure in the cooking utensil. Valves with such an indicating pin have been used extensively for a long time. Usually several annular grooves, which are associated, if necessary, with several differing restoring forces and are usually colored, and which are used for observing the pressure, are provided on the indicating pin. Such a valve consists thereby of several metallic individual parts and associated rubberelastic sealing elements. Even though the metal parts, but for the restoring spring, are turned parts manufactured by cutting, for example on a lathe and if desired on automated machines, the expense for the manufacture and the assembly of such a valve is significant. The metal parts must be physiologically unobjectionable for use with cooking utensils and must consist of a suitable, at least surface-treated material, such that the cost of manufacturing the valve is further increased, These valves serve, aside the purpose of indicating the pressure inside of the cooking utensil, also as a control for the cooking utensil by ventilating during the cooking process when the pressure is too high and thus regulating a maximum pressure within the utensil. Such a ventilation is also desired at the start of the operation of the cooking utensil in order to replace the air above the food with steam, and when the operating pressure of the cooking utensil is just about reached, the flow connection of the inside with the outside must then be interrupted. The indicating pin can be moved manually into a position, in which the inside of the cooking utensil can be ventilated and can become pressureless so that the lid can be removed without any significant risk to the user.

The conventional valves are difficult to clean and to service. They must for this purpose be at least disassembled into their individual parts requiring suitable tools and skill of a craftsman.

It therefore has also already been suggested according to the Gebrauchsmuster (German Utility Model Document) 295 01 112.2 to design such a valve substantially simpler in such a manner that it consists aside from the indicating pin for the pressure level only one single structural element, which is manufactured of a rubber-elastic material and can also perform a plurality of functions. Aside from the indicating pin, the valve consists thereby, in the most favorable case, only of one single holding piece, the elasticity of which is sufficient in order to be able to fasten it in the utensil wall without any additional structural elements, for example without a screwed connection or the like. The indicating pin drives through the rear front wall upon an overload of the pressure inside the cooking utensil until the control flange rests on the outer stop, and also the indicating pin returns in the opposite direction, again by overcoming the rear front wall by manually pressing it into its initial operating position.

It is furthermore known from the United Kingdom Patent Application GB 2 123 528 A to design a valve member in such a manner that a control piston constructed on the valve member controls a valve opening, which is formed as an elastic valve seat, which is provided in a recess in the lid of a cooking utensil. Upon an increasing pressure exceeding the operating pressure, the valve member, taking with it the valve seat, is finally driven so far out of the cooking utensil until an inherently stable stop piece constructed thereon rests on the lid, thereby covering the recess. Consequently two structural and operational parts consisting of entirely different materials are hereby needed to carry out all of the necessary functions.

The basic purpose of the invention is to design such a valve which is easily manufactured, yet be simpler and which maintains all functions carried out with such a valve.

The purpose is attained according to the invention with a valve member having a valve piston, which has means for indicating the pressure and is provided outside the cooking utensil, a control collar, which controls the valve opening and slides when a pressure in the cooking utensil exceeds the operating pressure through the valve opening and is otherwise provided within the cooking utensil, and an inherently stable stop piece constantly remaining within the cooking utensil, whereby the stop piece at least partially covers the valve opening and contacts the lid after the control collar has passed the valve opening, and whereby at least the control collar consists of an elastic material.

Such a valve member can easily consist of one piece so that not only its manufacture is very simple but also lowers the expenses for installation. The design of the invention allows the valve member together with the valve opening to carry out all the necessary functions, which otherwise can only be handled by several separate structural parts or even by several separately operating structural groups. The control collar can, in particular because of its elasticity, cover a wide range of operating pressures, whereby the deformed change of the control collar serves as the restoring force. The valve member can through a suitable design control both the start of boiling, after the air initially existing in the cooking utensil has been replaced with steam, and can also operate at a nonpermissible excess pressure as a safety valve.

The valve operates particularly efficiently as a pressure indicator when the valve opening is covered outside of the cooking utensil by a guide for the valve member fastened on the lid and spaced from said lid, which guide has a cylindrical bearing bore for the valve piston, which bearing bore is axially aligned with the valve opening, and the inside of which serves as an indicator for the pressureless state of the cooking utensil. Such a guide can be easily and inexpensively manufactured and mounted, for example, as a metal or plastic part fastened to the lid by spot welding and serves not only as a sliding bearing for the valve piston, but also prevents the steam blowing out of the valve from escaping directly upwardly, rather the escaping steam hits the guide and is laterally deflected so that there is a reduced danger when handling the cooking utensil to help prevent burning the hands of the operator. A pressureless state inside of the cooking utensil is clearly indicated, for example, after the ventilating through the valve, when the inside of the bearing bore has a color marking therein.

The operating pressure existing on the inside of the cooking utensil can be illustrated and indicated when conventionally peripherally extending annular grooves or similar markings are provided on the valve piston.

The internal pressure in the cooking utensil is controlled mainly by the steam being able to escape through the valve. A constant control operation is thereby particularly supported by the valve piston having, in a direction toward the cooking utensil, a preferably truncated constriction serving as a control edge, which constriction cooperates with and can abut the valve opening. The constriction can also be differently formed and can be equipped with a special control edge, corresponding details of the control edge are familiar from the state of the art. It is thereby advantageous when a flow connection between the inside of the cooking utensil and the outside is maintained when the valve piston contacts the valve opening. This is possible in a simple manner when the valve piston in the area of the constriction has at least one recess extending axially parallel on its periphery, which recess creates such a flow connection. Until the closure of the valve opening through the control edge at an increasing pressure in the cooking utensil, the air can escape during the start of boiling and is thereby replaced with steam. On the other hand, it is also in this manner assured that during a cooling off of the cooking utensil, for example in a water bath, an underpressure in the cooking utensil is safely avoided.

A particularly preferred embodiment of the invention is that the control collar is formed on the valve member in the form of an unobstructed peripherally extending lip seal ring, which in the relieved state is directed from the axis of symmetry of the valve member inclined outwardly and can be elastically deformed under an excess pressure in the cooking utensil. The seal lip of the lip seal ring ends in an annular edge, which can be pressed onto the lid and thereby seals the valve opening from the inside of the cooking utensil in a fluid tight arrangement.

The control collar is deformed with an increasing pressure within the interior of the cooking utensil and rests finally flat on the lid. The increasing deformation and a corresponding increase of the pressure can be read by the position of the valve piston, and, in particular, its annular grooves.

It is advantageous when the stop piece is designed as a plate covering the valve opening on the front side of the valve member, which front side is on the inside of the cooking utensil, so that the valve member is held securely in the valve opening even when the control collar has passed through the same and is outside of the cooking utensil. A further increase of the pressure is prevented in such a manner that the stop piece has at least one recess extending axially parallel on its periphery. The recess creates a flow connection of the cooking utensil with the outside when the stop piece rests on the valve opening.

The design of the inventive valve assures the possibility that the valve member consists therethrough of one or of several elastic materials. It is thereby undoubtedly particularly economical when the valve member is made of one elastic material, at most in parts, for example on a stop piece, supplemented by a reinforcement of an inherently stable material provided inside the value member in order to locally prevent a change in form.

In particular in the case of a one-piece design of the valve member consisting homogeneously of the same material, it becomes clear that the invention has created an inexpensive and functional control and indicating member for a cooking utensil of the above-identified type, which moreover can also be quickly exchanged on the lid by a man skilled in the art.

BRIEF DESCRIPTION OF THE DRAWINGS

The invention will be discussed in greater detail hereinafter in connection with the drawing using one exemplary embodiment.

In the drawings.

DETAILED DESCRIPTION

Figure 1:
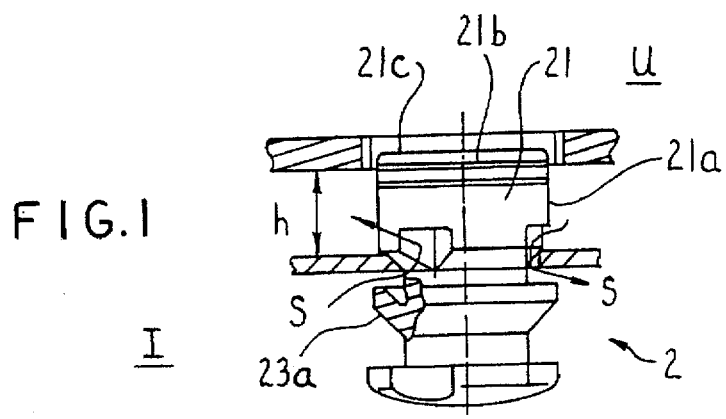
FIG. 1 is a schematic illustration of a valve of the invention in a first operating position.

The drawings show according to FIGS. 1 to 4 only a limited, cross-sectional area of a lid D of a cooking utensil, which operates with excess pressure, on an inside I of the cooking utensil. A valve opening S is provided in the lid D, which opening fluidly connects the inside I to the outside U and is controlled by a valve member 2. The lid D can be locked in a conventional manner on the cooking utensil, mostly via an edge-supported lock. The details for this are generally known and are not shown in the drawing.

Figure 3:
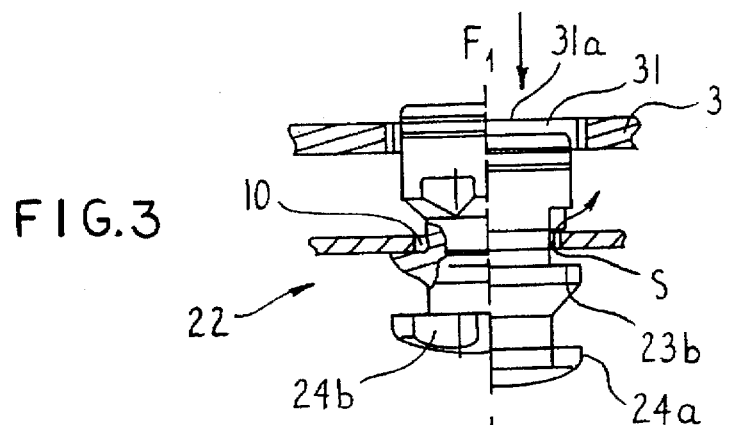
FIG. 3 is a partial cutaway illustration showing a third operating position with the first position.
Figure 4:
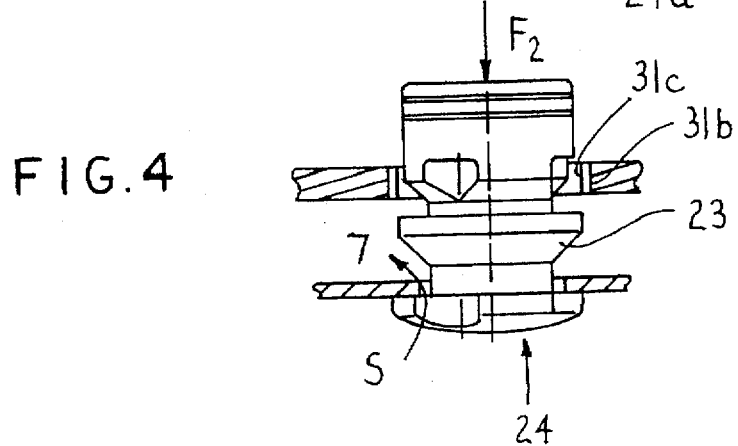
FIG. 4 is a schematic illustration of a fourth operating position of the valve.

A guide 3 for the valve member 2 provides a space at a height h above the lid D, which guide is fastened in a suitable manner to the lid D, for example, by means of resistance spot welding. The valve member 2 is thereby supported so as to be longitudinally movable with its upper area designed as a cylindrical valve piston 21 in the guide 3. Two annular grooves 21b are recessed on the outer surface 21a of the valve piston 21. The annular grooves can be colored in order to easily recognize the elevational position of the valve member 2 (FIGS. 3 and 4). When the valve piston 21 is so far below the guide 3 that the annular grooves 21b are not visible (FIGS. 1 and 2), then the distance of the upper front surface 21c of the valve piston 21 from the upper edge 31a of the bearing bore 31 offers a sufficient optical guide for the operator as to which operating state exists at that point. The indicating function is further improved when the inside 31b of the bearing bore 31 is colored. A corresponding plating 31c is indicated in the drawing. The drawing makes it clear that the arrangement of the valve member 2 in relationship to the guide 3 is such that the valve piston 21 in all operating positions of the valve will never completely disengage from the bearing bore 31.

A further support of the valve member 2 takes place in the valve opening 1, in which either (FIGS. 2 to 4) a valve shaft 22 concentric to the valve piston 21 is guided with a clearance or (FIG. 1) a conical constriction 21d of the valve piston 21 rests in a centered position in the valve opening 1. The valve shaft 22 is divided into a first shaft area 22a between the valve piston 21 and a control collar 23 on the circumference of the valve member 2, and into a further shaft area 22b between the control collar 23 and a stop piece 24 positioned at the end of the valve member 2, which end is distal the piston 21. The diameter of the valve shaft 22 extending through the valve opening 1 is dimensioned in such a manner that between the valve shaft 22 and the valve opening 1 there remains an annular chamber 10, which serves as a flow connection S between the inside I of the cooking utensil and the outside U of the cooking utensil. The flow connection(s) S is/are shown in the drawing (FIGS. 1, 3 and 4) by arrows.

When the valve member 2 during the start of boiling or after a cooling off of the cooking utensil rests with its own weight with its constriction 21d on the valve opening 1 because the pressure inside I of the cooking utensil has dropped, then, according to FIG. 1, a flow connection S is also maintained when first recesses 21e distributed on the periphery of the constriction 21d and extending into the outer surface 21a are cut into the valve piston 21. The control collar 23 is spaced axially from the valve piston 21 on the valve shaft 22 so far that it does not rest on the lid D when the constriction 21d, shown in FIG. 1, rests on the valve opening 1 so that flow medium can flow unhindered in and out through the flow connection S. In particular (FIG. 1 on the right) after a cooling off of the cooking utensil air is sucked in from the outside U through the annular chamber 10 so that a reduced pressure which hinders the opening of the cooking utensil is not created on the inside I of the cooking utensil. On the other hand (FIG. 1 on the left), the entire air above the food is during the start of boiling initially driven out and is successively replaced with steam, which contributes to an improvement in the preparation of food, for example in its taste and smell. The valve thus also acts as a so-called aroma valve.

Figure 2:
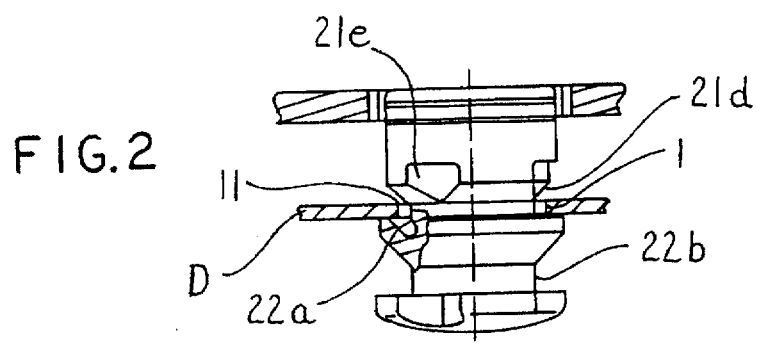
FIG. 2 is a schematic illustration of a valve of the invention in a second operating position.

The control collar 23 is designed like a lip seal ring corresponding to FIGS. 1 and 2 as a seal lip 23 pointing (in cross section) inclined outwardly and upwardly, which seal lip ends in an annular edge 23b extending circumferentially around the valve member 2. The annular edge 23b contacts during an increasing pressure inside I of the cooking utensil the underside of the lid D (FIG. 2) and interrupts the flow connection S between the interior of the cooking utensil and the outside U of the cooking utensil. The arrangement is designed such that this operating state can be easily recognized since the front surface 21c is then aligned flush with the upper edge 31a of the guide 3 (FIG. 2). The boiling starts in this position of the valve member 2 and results in a further pressure increase in the inside I until the actual cooking process occurring under an increased pressure starts. The associated operating pressure can be read on the valve piston 21, the annular grooves 21b of which become visible (FIG. 3 on the left) during an increasing pressure. The sealing lip 23a is thereby deformed against its deformation resistance until it rests circularly flat on the underside of the lid D. The heat supplied to the cooking utensil is at the same time throttled so that a pressure exceeding the associated operating pressure inside I of the cooking utensil is avoided.

FIG. 3 indicates (on the right) that the cooking utensil can be easily ventilated when a ventilating force in arrow direction $F_1$ is manually applied to the front surface 21c of the valve piston 21 until the control collar 23 is again spaced from the lid D. The stopping position of the ventilating force $F_1$ is easily determined by the subsequent contact of the constriction 21d with the upper edge 11 of the valve opening 1, which the operator safely recognizes even without a visual connection. Even then (FIG. 1, FIG. 3 on the right) the inside I is further ventilated through the first recesses 21e.

When the pressure in the cooking utensil is further increased beyond the permissible operating pressure when, for example, the heat supply is not interrupted or throttled, then the control collar 23 is driven through the valve opening 1, the annular change 10 of which is dimensioned accordingly. The stop piece 24 rests then on the valve opening 1 (FIG. 4). It is sufficient according to the invention that the stop piece 24 cannot also be driven out under pressure through the valve opening 1. On the other hand, second recesses 24b exist in the radial circumference 24a of the stop piece 24, which recesses create a renewed flow connection S between the inside I and the outside U so that a nonpermissible pressure in the cooking utensil is quickly reduced. In this manner, the valve of the invention represents also a safety valve.

The position of the valve member 2 in the valve opening 1, illustrated in FIG. 4, is stable, however, the valve member can be returned into the operating position of FIGS. 1 and 2. Accordingly, the valve piston 21 is manually returned by a restoring force applied in arrow direction $F_2$ to the front surface 21c of the valve piston 21 projecting outward from the guide 3, whereby the control collar 23 moves again through the valve opening 1 into the inside I.

The invention claimed is:

1. In a valve for a cooking utensil which is adapted to be operated with excess pressure and closed with a lid, comprising a valve member arranged in a valve opening provided in the lid, said valve member being axially aligned and moveable within said valve opening, the improvement comprising said valve member having a valve piston, said valve piston having means for indicating the pressure provided outside of the cooking utensil, a control collar for controlling said valve opening, said control collar being larger in diameter than said valve and into engagement with an inside surface of said lid encircling said valve opening and axially movable with respect to said valve opening in response to a pressure in the cooking utensil and is initially maintained oriented within the cooking utensil, and a stop piece constantly remaining within the cooking utensil, said stop piece partly covering said valve opening and contacting said lid when said control collar has passed through said valve opening, and at least said control collar consisting of an elastic material so that it can be urged through said valve opening to a location outside of the cooking utensil in response to the pressure in the cooking utensil exceeding the operating pressure, said axial movement orienting said control collar outside of the cooking utensil being stopped by said stop piece contacting an inside surface of said lid.

2. The valve according to claim 1, wherein said valve opening is covered outside of the cooking utensil by a guide for said valve member, said guide being fastened on the lid and spaced therefrom, and said guide having a circular-cylindrical bearing bore for receiving said valve piston, said bearing bore being axially aligned with said valve opening, and wherein an inside wall of said bearing bore serves as an indicator for a pressureless state of the cooking utensil by reason of a lack of presence therein of said valve piston.

3. The valve according to claim 2, wherein the inside wall of said bearing bore has a color marking.

4. The valve according to claim 1, wherein peripherally extending annular grooves or similar markings are provided on said valve piston.

5. The valve according to claim 1, wherein said valve piston has in a direction facing toward the cooking utensil a truncated constriction serving as a control edge, and wherein said constriction rests on said valve opening in a pressureless state of the cooking utensil.

6. The valve according to claim 5, wherein said valve piston has in the area of said constriction at least one recess extending axially over a periphery of said valve piston, said recess defining a flow connection of the interior of the cooking utensil with the outside when said constriction rests on said valve opening.

7. The valve according to claim 1, wherein said control collar is formed on said valve member in the form of an unobstructed peripherally extending lip seal ring, which in a relieved state is directed from the axis of symmetry of said valve member inclined outwardly and can be elastically deformed under an excess pressure in the cooking utensil, wherein a seal lip of said control collar ends in an annular edge which engages an interior surface of said lid to thereby fluidly separate the valve opening from the inside of the cooking utensil.

8. The valve according to claim 1, wherein said stop piece is constructed as a plate covering said valve opening from the inside of the cooking utensil.

9. The valve according to claim 1, wherein said stop piece has at least one recess on a periphery thereof extending axially parallel to a longitudinal axis of said valve member, and wherein said recess creates a flow connection between the interior of the cooking utensil and the outside when said stop piece rests on the interior surface of the lid encircling said valve opening.

10. The valve according to claim 1, wherein said valve member consists throughout of at least one elastic material.

11. The valve according to claim 1, wherein said valve member includes an outwardly facing surface adapted to be pressed on for forcing said control collar back through said valve opening into the cooking utensil.

12. The valve according to claim 1, wherein said control collar has an annular edge facing said interior surface of said lid when said control collar is oriented within the cooking utensil, said annular edge extending generally radially from said valve member, said control collar tapering from said annular edge to said valve member toward said stop piece, and said annular edge contacting said interior surface of said lid when said operating pressure in the cooking utensil is in a cooking range and elastically yielding so that said control collar is urged through said valve opening when said operating pressure is exceeded.

13. A valved pressure cooker, comprising a cooking utensil enclosing an interior having one open end, a lid adapted to engage said cooking utensil closing said one open end, said lid having a valve opening therein, and an elastically deformable valve member movably supported in said valve opening, said valve member having a control collar and a stop, said control collar being adapted to uniformly contact an interior surface of said lid when the pressure in the closed interior of said cooking utensil reaches a first pressure sealing said valve opening and being adapted to elastically deform so as to be forced through said valve opening when the pressure in the closed interior of said cooking utensil exceeds a second pressure opening said valve opening to relieve the pressure within said cooking utensil, said stop being longitudinally spaced from said control collar on said valve member and having a stop face non-yieldingly contacting said interior surface of said lid preventing said valve member from completely exiting said valve opening and allowing the relief of pressure within said cooking utensil.

14. The valved pressure cooker according to claim 13, wherein said control collar has an annular edge radially extending from said valve member, said annular edge having a diameter greater than said valve opening, said annular edge closing said valve opening when the pressure within said cooking utensil exceeds said first pressure, and said control collar tapering from said annular edge toward said stop.

15. The valved pressure cooker according to claim 14, wherein said valve member includes an outwardly facing surface adapted to be manually engaged for forcing said control collar back through said valve opening into said cooking utensil when the pressure inside the cooking utensil has been relieved, and a tapered region of said control collar precedes said annular edge through said valve opening when said outwardly facing surface is manually engaged to force said control collar back through said valve opening.

* * * * *

UNITED STATES PATENT AND TRADEMARK OFFICE
CERTIFICATE OF CORRECTION

PATENT NO. : 5,724,884
DATED : March 10, 1998
INVENTOR(S) : Wolfgang FISCHBACH

It is certified that error appears in the above-indentified patent and that said Letters Patent is hereby corrected as shown below:

On the title page, item [73] change Assignee's name "Heinrich Baumgarten KG" to
---Heinrich Baumgarten KG Spezialfabrik fuer Beschlagteile---.

Signed and Sealed this

Fourth Day of August, 1998

Attest:

BRUCE LEHMAN

Attesting Officer

Commissioner of Patents and Trademarks